United States Patent
Pluderman et al.

(10) Patent No.: US 11,570,199 B2
(45) Date of Patent: Jan. 31, 2023

(54) THREAT PREVENTION BY SELECTIVE FEATURE DEPRIVATION

(71) Applicant: Intel Corporation, Santa Clara, CA (US)

(72) Inventors: Shay Pluderman, Petach Tikva (IL); Omer Ben-Shalom, Rishon le-Tzion (IL); Shlomo Avital, Jerusalem (IL); Tzipi Wales, Givat-Ze'ev (IL); Elisheva Zobin, Jerusalem (IL)

(73) Assignee: INTEL CORPORATION, Santa Clara, CA (US)

( * ) Notice: Subject to any disclaimer, the term of this patent is extended or adjusted under 35 U.S.C. 154(b) by 174 days.

(21) Appl. No.: 17/132,531

(22) Filed: Dec. 23, 2020

(65) Prior Publication Data

US 2021/0120028 A1  Apr. 22, 2021

(51) Int. Cl.
*H04L 29/00* (2006.01)
*H04L 9/40* (2022.01)

(52) U.S. Cl.
CPC ........ *H04L 63/1433* (2013.01); *H04L 63/102* (2013.01); *H04L 63/105* (2013.01); *H04L 63/108* (2013.01)

(58) Field of Classification Search
CPC . H04L 63/1433; H04L 63/102; H04L 63/105; H04L 63/108; G06F 21/568; G06F 21/577
See application file for complete search history.

(56) References Cited

U.S. PATENT DOCUMENTS

| | | | |
|---|---|---|---|
| 11,120,450 B1* | 9/2021 | Buckingham | G06Q 20/385 |
| 2003/0120938 A1* | 6/2003 | Mullor | G06F 21/14 |
| | | | 713/190 |
| 2013/0125201 A1* | 5/2013 | Sprague | G06F 21/6263 |
| | | | 726/28 |
| 2013/0198848 A1 | 8/2013 | Wolff | |
| 2014/0020104 A1 | 1/2014 | Marinescu et al. | |
| 2014/0089113 A1* | 3/2014 | Desai | G06Q 20/3278 |
| | | | 705/16 |
| 2016/0321752 A1* | 11/2016 | Tabacco | G06Q 40/04 |
| 2017/0141946 A1* | 5/2017 | Balestrazzi | H04L 41/0686 |
| 2017/0220808 A1* | 8/2017 | Schmidt | G06F 21/577 |
| 2017/0337355 A1* | 11/2017 | Biswas | H04L 67/01 |

(Continued)

FOREIGN PATENT DOCUMENTS

EP    4020283 A1    6/2022

OTHER PUBLICATIONS

Extended European Search Report, EP Application No. 21194560.5, dated Feb. 23, 2022, 9 pages, EPO.

(Continued)

*Primary Examiner* — Don G Zhao
(74) *Attorney, Agent, or Firm* — Jaffery Watson Mendonsa & Hamilton LLP (57) ABSTRACT

A method of preventing exploitation of a vulnerability of a computing system includes generating a deprivation token to cause disabling of a selected one or more features of a component of the computing system to prevent an exploit of a vulnerability affecting the selected one or more features; and publishing the derivation token to at least one of a computing system manufacturer computing system and an enterprise information technology (IT) computing system for distribution to affected computing systems.

24 Claims, 6 Drawing Sheets

(56) References Cited

U.S. PATENT DOCUMENTS

2019/0007212 A1* 1/2019 Neve de Mevergnies ................
                                                    G06F 21/335
2019/0306173 A1* 10/2019 Reddy ................. G06F 11/3604
2020/0351093 A1* 11/2020 Madhuram ............ H04L 9/0819
2020/0372155 A1* 11/2020 Verma ..................... G06F 21/74
2021/0112087 A1* 4/2021 Tassoumt .................. H04L 9/50
2021/0152455 A1* 5/2021 Castle ..................... H04L 43/10
2021/0157926 A1* 5/2021 Handurukande ...... G06N 20/20
2021/0288981 A1* 9/2021 Numainville ....... H04L 63/1441
2022/0100868 A1* 3/2022 Tarrant .................. G06F 21/577

OTHER PUBLICATIONS

European Patent Application No. 21194560.5, "Extended European Search Report" dated Feb. 23, 2022, 9 pages.

* cited by examiner

THREAT PREVENTION BY SELECTIVE FEATURE DEPRIVATION

FIELD

Embodiments relate generally to computer security, and more particularly, to preventing threats by selective feature deprivation in computing systems.

BACKGROUND

From time-to-time exploitable vulnerabilities in computing systems become known. The vulnerabilities often cannot be patched immediately for various reasons (e.g., a corrective patch is not yet available, system downtime is not approved at this time, etc.). This creates significant windows of opportunity for attackers to attempt exploits based on these vulnerabilities.

Current solutions try to address the vulnerability by patching or otherwise updating the computing systems to overcome the vulnerability as soon as possible or by creating a set of compensating controls on the network side to limit the possibility of an exploit reaching the computing system and using the vulnerability. In some cases, these attempts are described as 'virtual patching' of the computing system. Disadvantages of patching is that patches are often not available when the vulnerability is discovered and the time to develop, certify and distribute patches allows the computing systems to remain vulnerable. Disadvantages of the 'compensating controls' model include that it is often complex to define a 'virtual patch', as it requires understanding an exploit and devising an effective pattern matching and/or heuristics solution in a way that does not create false positives (e.g., impacting the system) or false negatives (e.g., allowing exploitation); suitable network security infrastructure between vulnerable computing systems and potential infection sources is not always available; and if the attack is performed over encrypted protocols (e.g., transport layer security (TLS)), the efficacy of network security requires suitable decryption operations, which in most cases is not available.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope. The figures are not to scale. In general, the same reference numbers will be used throughout the drawings and accompanying written description to refer to the same or like parts.

DETAILED DESCRIPTION

Implementations of the disclosure provide a method and system for preventing threats based on known vulnerabilities by making selected features of computing systems affected by those vulnerabilities temporarily unavailable or 'deprived.' Embodiments of the present invention include a computing system, or one or more components of a computing system, pre-configured during a manufacturing step such that one or more features (or sets of features) of the components and/or computing systems are pre-set to be enabled. When a vulnerability becomes known that affects a feature, the feature can be selectively disabled (e.g., made unavailable) remotely by a management entity such as a computer system manufacturer or an enterprise information technology (IT) department to prevent attempts to exploit the computing system based on the vulnerability until a permanent solution (e.g., a patch or system upgrade) becomes available.

Embodiments do not rely on detection or analysis of a vulnerability by external logic but enables control of feature deprivation built into the computing system, by external triggers sent to the computing system to activate selective "protected modes" with one or more features disabled. The functionality of the one or more features can be restored/enabled once the computing system has been appropriately patched or upgraded, or a time period defined in a deprivation token has expired.

In some embodiments, patching the computing system to address the vulnerability includes re-enabling previously disabled features. In an embodiment, re-enabling disabled features is performed after a time period defined in a deprivation token has expired. In an embodiment, re-enabling disabled features is performed by as part of a firmware update. In an embodiment, re-enabling disabled features is performed by the same mechanism that the features were disabled, but with an indication of enabling the features instead of disabling the features. Embodiments may also be used to deprive certain features, or parts thereof such as quality of service levels, even for handling of bugs or mitigating performance issues in computing systems.

Having a feature deprivation capability built into the computing system (or any component of the computing system) at the time of design and/or manufacturing provides for potential temporary future mitigation of a vulnerability until a permanent solution for the problem is found and deployed without the need to deduce, build and deploy small or large threat preventions. Feature deprivation can be easily triggered by communication of a small deprivation token to affected computing systems, and the feature deprivation action can be taken consciously and simply to prevent exploitation of vulnerabilities in widely deployed computing systems. The capability to selectively control feature deprivation being built into the computing system at the time of design and/or manufacturing allows this capability to be tested prior to sale and/or distribution of the computing system and to be used when the computing system is in the field (e.g., operated by users) without extensive testing once a vulnerability becomes known. In some embodiments this allows for better unit testing of features by having the capability to isolate selected components or features throughout the development and testing cycle.

Some advantages include quick threat prevention; enablement of slower, more structured vulnerability patching; deterrence of potential brand and legal implications which may be caused by such vulnerabilities; the capability for potential mitigations also for non-security issues; broad coverage where a single deprivation token can address multiple vulnerabilities in multiple components, products and versions of firmware (e.g., for situations where individual binary-based patches are required for different firmware and/or components).

Figure 1:
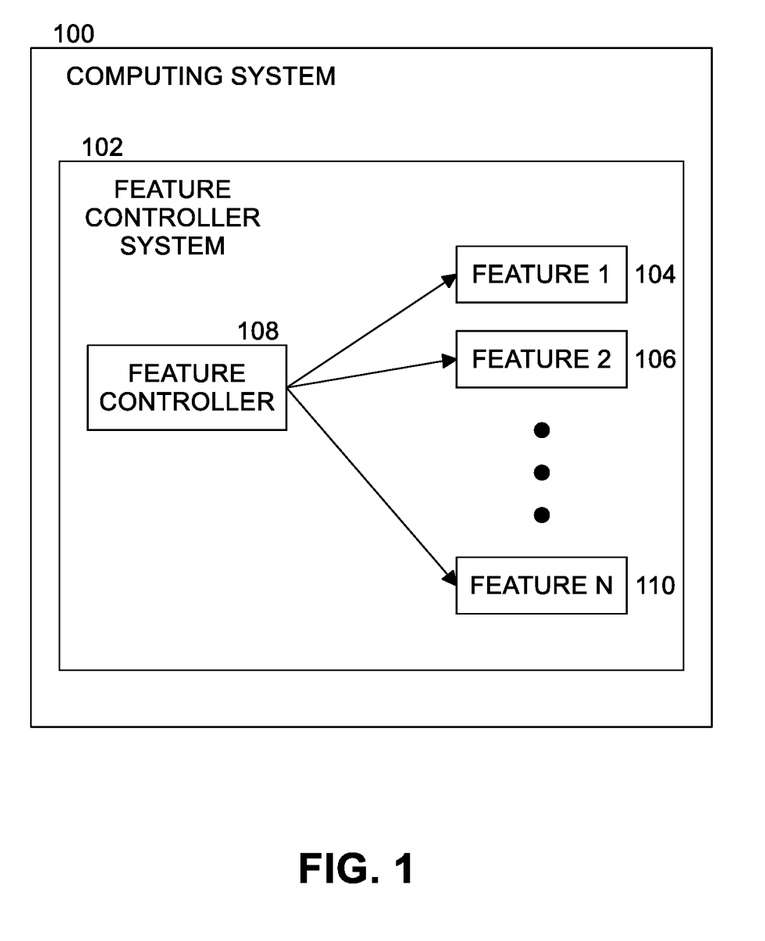
FIG. 1 is a diagram of feature controller system according to some embodiments.

FIG. 1 is a diagram of feature controller system 102 according to some embodiments. Computing system 100 may include one or more stationary or portable electronic or handheld electronic devices, for instance desktop computers, smartphones, portable computers, tablet computers, wearable computers, consumer electronics devices (e.g., television sets, stereo equipment, digital video recorders (DVRs), set-top boxes, satellite receivers, etc.), personal computers ("PCs"), network PCs, minicomputers, servers, server blades, mainframe computers, field programmable gate arrays (FPGAs), Internet of Things (JOT) devices, and the like. Computing system 100 includes feature controller system 102 to selectively disable and/or re-enable one or more features of the computing system. In an embodiment, disabling one or more features is performed in response to detection of a known vulnerability of the computing system, but the present approach is not limited to this scenario.

A vulnerability may be any weakness or deficiency in the security of the computing system, such as resulting from a side-channel attack, a race condition exploit, memory corruption, return oriented programming (ROP), buffer overflow, use-before-free, etc.

Computing system 100 includes one or more features, such as feature 1 104, feature 2 106, . . . feature N 110, where N is a natural number. As used herein, a feature may be any capability of computing system 100, whether implemented in firmware or hardware of any component of the computing system. For example, a feature may be any capability of a processor and/or computing system that may end up being exploitable. Examples include out-of-order execution, privilege levels and protection domains, speculative execution, software guard extension (SGX) technology commercially available from Intel Corporation, security enclaves, support for various data formats, time-based handshakes between components, virtualization of components, etc. For example, a feature may be any function or capability of firmware running on computing system 100, such as disabling local area discovery or other functions in Internet Protocol (IP) version 6 (IPv6) or disabling a "system defense" feature of Intel® Active Management Technology (AMT).

Feature controller 108 of feature controller system 102 within computing system 100 includes the capability to receive a notification of a vulnerability and identification of one or more features affected by the vulnerability and to disable the one or more features on any component of computing system 100. When computing system 100 is patched to address the vulnerability, feature controller 108 includes the capability to re-enable the disabled one or more features.

Figure 2:
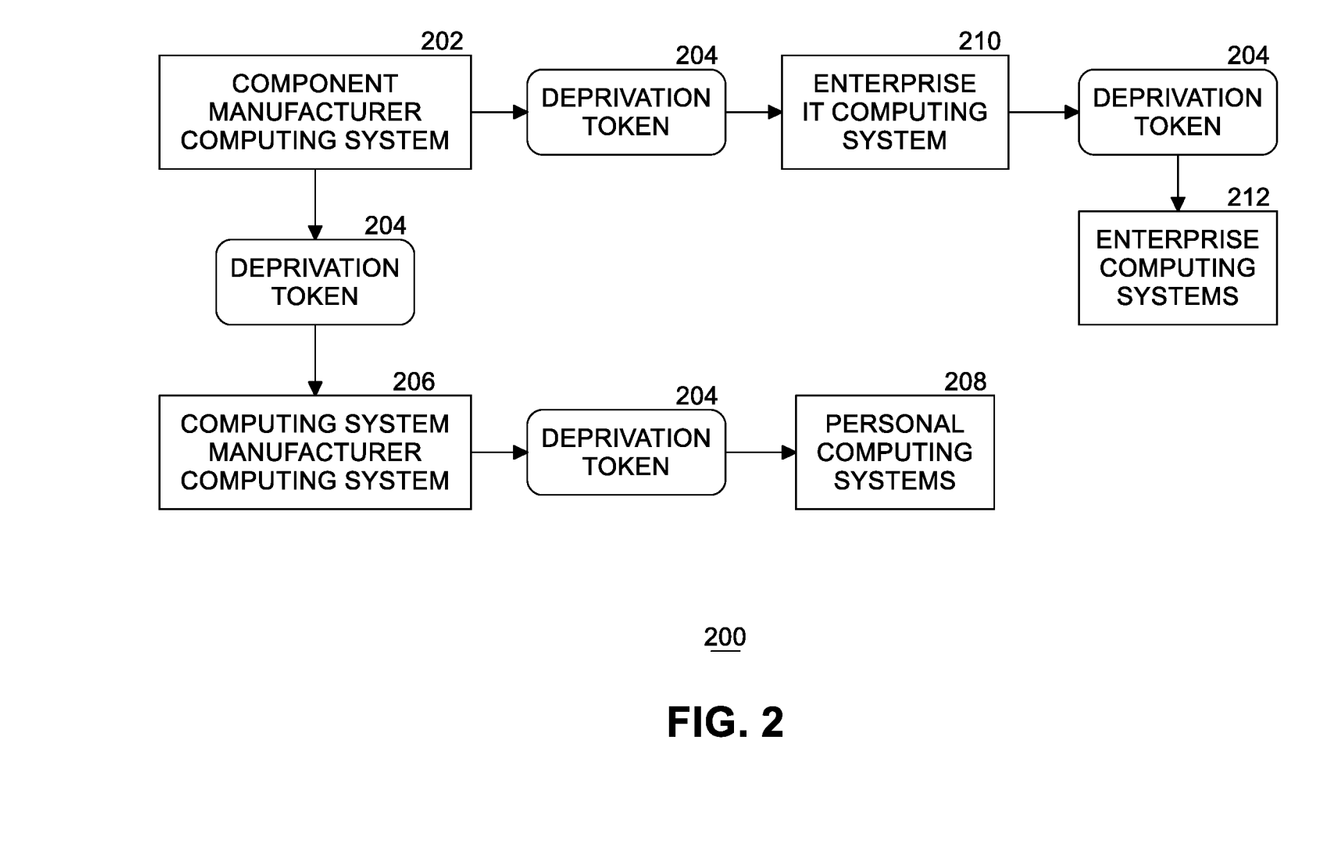
FIG. 2 is a diagram of a feature deprivation system according to some embodiments.

FIG. 2 is a diagram of a feature deprivation system 200 according to some embodiments. When a vulnerability affecting one or more features of a component of computing system 100 becomes known, component manufacturer computing system 202 generates a deprivation token 204 to indicate the vulnerability, one or more features to be disabled, and a valid time period for the deprivation of the one or more features to be effective. For example, when the component affected by the vulnerability is a processor, the component manufacturer is a processor manufacturer (such as Intel® Corporation for example) whose computing system generates the deprivation token. For personal computing systems 208 purchased by individual users from a computing system manufacturer (either directly from the computing system manufacturer or through a retail store), component manufacturer computing system 202 sends a deprivation token 204 to a computing system 206 of the computing system manufacturer (such as Lenovo®, Apple®, Hewlett Packard (HP®), Dell®, Acer®, Asus®, and so on). Computing system manufacturer computing system 206 then sends the deprivation token 204 using known communications methods to affected personal computing systems 208. In one embodiment, the token is sent to affected computing systems through a management entity such as a converged security management engine (CSME) commercially available from Intel Corporation and through an interface such as the host to CSME controller interface (HECI). In one embodiment, the deprivation token is included in an update to the firmware (e.g., the basic input/output system (BIOS)) of the personal computing systems 208. For enterprise computing systems 212 managed by an enterprise information technology (IT) organization (e.g., in a business, government agency, non-profit organization, or other entity), component manufacturer computing system 202 sends deprivation token 204 to a computing system 210 of the enterprise IT organization to be deployed to affected managed enterprise computing systems 212 in the organization. In another embodiment, computing system manufacturer computing system 206 sends the deprivation token 204 to enterprise IT computing system 210 instead of component manufacturer computing system 202. In another embodiment, component manufacturer computing system 202 sends the deprivation token directly to one or more personal computing systems 208 and/or enterprise computing systems 212.

Figure 3:
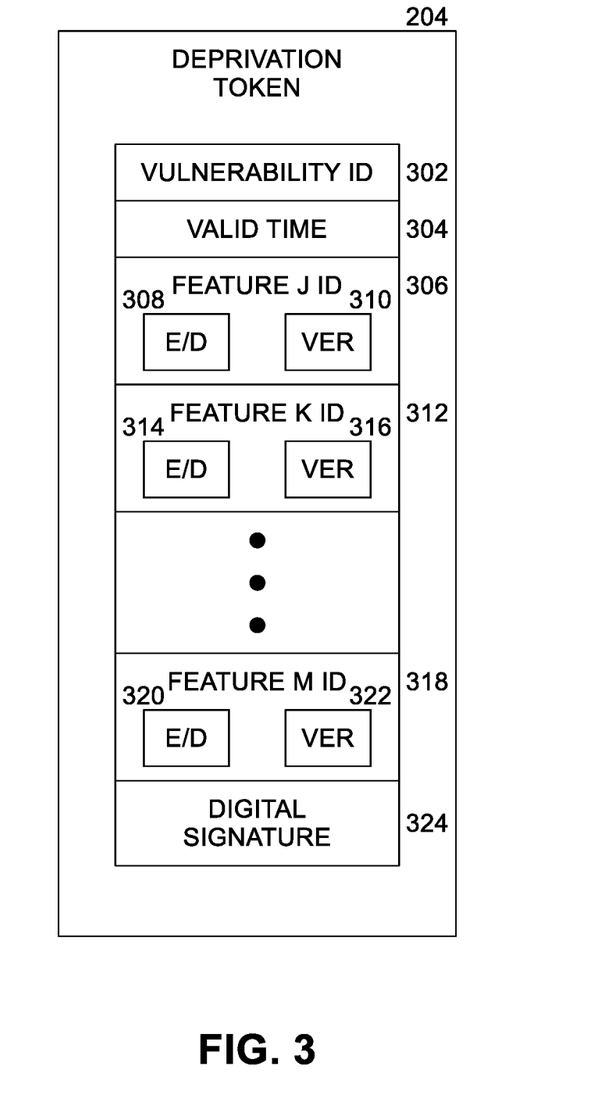
FIG. 3 is a diagram of a deprivation token according to some embodiments.

FIG. 3 is a diagram of a deprivation token 204 according to some embodiments. As compared to typical patches and software/firmware updates, deprivation token 204 is small (e.g., perhaps as small as a few hundred bytes) and does not require an extensive process of designing, testing, validating, signing, provisioning, and supporting like typical patching deployments.

In one embodiment, deprivation token 204 is generated and digitally signed by component manufacturer computing system 202. In another embodiment, deprivation token 204 is generated and digitally signed by computing system manufacturer computing system 206. Deprivation token 204 includes at least one vulnerability identifier (ID) 302, a valid time 304 for the deprivation to be effective, one or more feature IDs such as feature J ID 306, feature K ID 312, . . . feature M ID 318, and a digital signature 324. In other embodiments, additional fields may be added to the deprivation token. Vulnerability ID 302 uniquely identifies the at least one vulnerability to be addressed by this deprivation token. Vulnerability ID 302 may be repeated for multiple vulnerabilities. The feature IDs 306, 312, . . . 318 identify the features to be disabled. In one embodiment, each feature field includes an enable/disable (E/D) flag indicating whether the feature is to be enabled or disabled. For example, feature J ID 306 includes E/D flag 308, feature K ID 312 includes E/D flag 314, . . . feature MID 318 includes E/D flag 320. This allows individual features to be enabled or disabled in the same deprivation token. In one embodiment, feature IDs also uniquely identify a version of the feature that is to be deprived. In one embodiment, each feature field includes a version (VER) indicating feature version. For example, feature J ID 306 includes VER 210, feature K ID 312 includes VER 316, . . . feature M ID 318 includes E/D VER 322. In an embodiment, the version field can affect which versions of the feature are affected by processing of the deprivation token. For example, the version could signify that the currently indicated (vulnerable) version and all prior versions are affected by the deprivation token, but later versions are not affected by the deprivation token (e.g., once the firmware is updated for a computing system then the deprivation token is not effective for that computing system). Digital signature 312 is used to authenticate and/or attest to the validity of the deprivation token 204 using known cryptographic methods.

In an embodiment, valid time field 304 specifies a time period for which disabling of the one or more features is desired. Computing system 100 then disables the one or more features for the specified time period, and then automatically re-enables one or more features after the specified time period has expired. In one embodiment, the time period defines an elapsed time from reception of the deprivation token (e.g., a relative time). In another embodiment, the time period specifies an ending time and date (e.g., an absolute time, such as indicating the deprivation token is not valid after the specified time and date). In another embodiment, both time periods may be specified in the deprivation token. In any case, when any of the conditions specified by the valid time field 304 are met, the deprivation token becomes ineffective and the features are re-enabled. For example, a deprivation token may sent every X days (where X is a natural number) to a plurality of computing systems with X+1 days validity while patching efforts are underway, and the patched computing systems can then be re-enabled without sending additional deprivation tokens.

In an embodiment, a "heartbeat" model may be used whereby component manufacturer computing system 202 periodically sends successive deprivation tokens 204 to computing system manufacturer computing systems 206 and/or enterprise IT computing systems 210, each deprivation token specifying an applicable time period, and the recipients of the deprivation tokens re-enable the one or more features after the last time period has expired.

In an embodiment, features may be grouped into sets of features for disablement/enablement based on a vulnerability.

Figure 4:
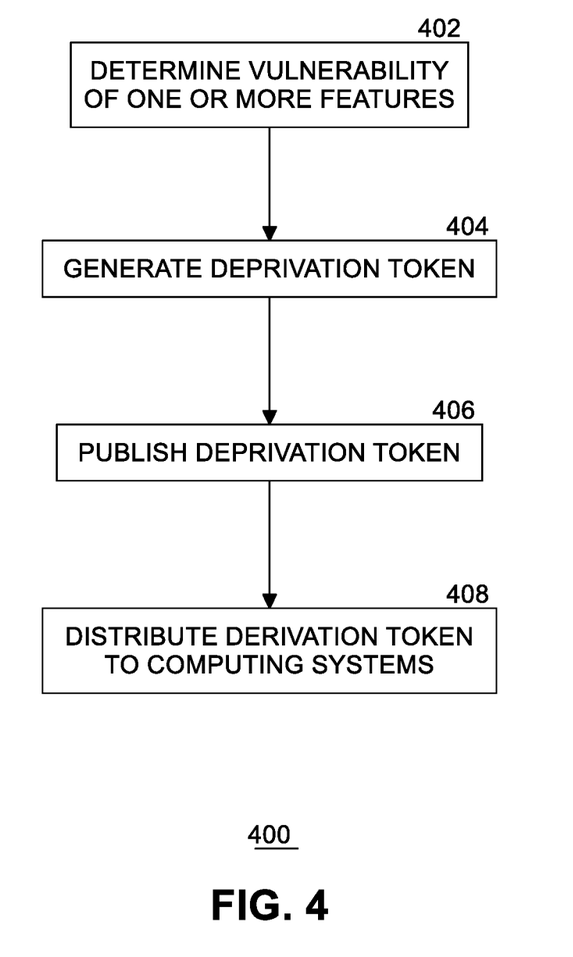
FIG. 4 is a flow diagram of component manufacturer feature deprivation processing according to some embodiments.

FIG. 4 is a flow diagram of component manufacturer feature deprivation processing 400 according to some embodiments. During design and manufacturing time for a component, component manufacturer designs and tests the component to work properly even if one or more selected features disabled. This gives the manufacturer confidence that even if a vulnerability is detected in the future that exposes a selected feature to an exploit as a result of the vulnerability, the selected feature can be disabled without causing the component or the computing system 100 to malfunction. Thus, embodiments of the present invention allow the component manufacturer to "pre-validate" mitigation efforts involving disabling features of components already in the stream of commerce in response to future detection of vulnerabilities. This capability may be used to enhance unit testing and validation.

At block 402, a component manufacturer operating component manufacturer computing system 202 determines that a vulnerability exists for one or more features of a component developed by component manufacturer. For example, a processor manufacturer (such as Intel® Corporation) may determine that a vulnerability exists for a feature of a processor. In one scenario, the component manufacturer determines the vulnerability exists through its own research, development, and/or testing activities. In one embodiment, the vulnerability is detected by automatically running tests and analysis by component manufacturer computing system 202 on components, enterprise computing systems 212 and/or personal computing systems 208. In another scenario, the vulnerability is identified and becomes known through the activities of others, such as computer security researchers, security companies, anti-virus companies, hackers, and so on. Regardless of who initially detected the vulnerability, component system manufacturer desires to prevent threats and/or exploits based on the vulnerability as soon as possible, without waiting for perhaps lengthy efforts to develop a patch as a permanent solution. In another embodiment, the "vulnerability" may actually be a critical function defect, design flaw or fault instead of a security vulnerability.

At block 404, component manufacturer computing system 202 generates a deprivation token 204 to address the vulnerability. At block 406, component manufacturer computing system 202 publishes the derivation token. In one embodiment, publishing the derivation token comprises sending the derivation token to one or more enterprise IT computing systems 210 and/or one or more computing system manufacturer computing systems 206. At block 408, the recipient of the derivation token from the component manufacturing computing system 202 then distributes the derivation token to affected computing systems. For example, enterprise IT computing system 210 sends the derivation token to affected enterprise computing systems 212, and computing system manufacturer computing system 206 sends the derivation token to affected personal computing systems. In one embodiment, component manufacturing computing system 202 sends the derivation token directly to one or more affected enterprise computing systems 212 and/or one or more affected personal computing systems 208 without the involvement of enterprise IT computing system 210 or computing system manufacturer computing systems 206.

Figure 5:
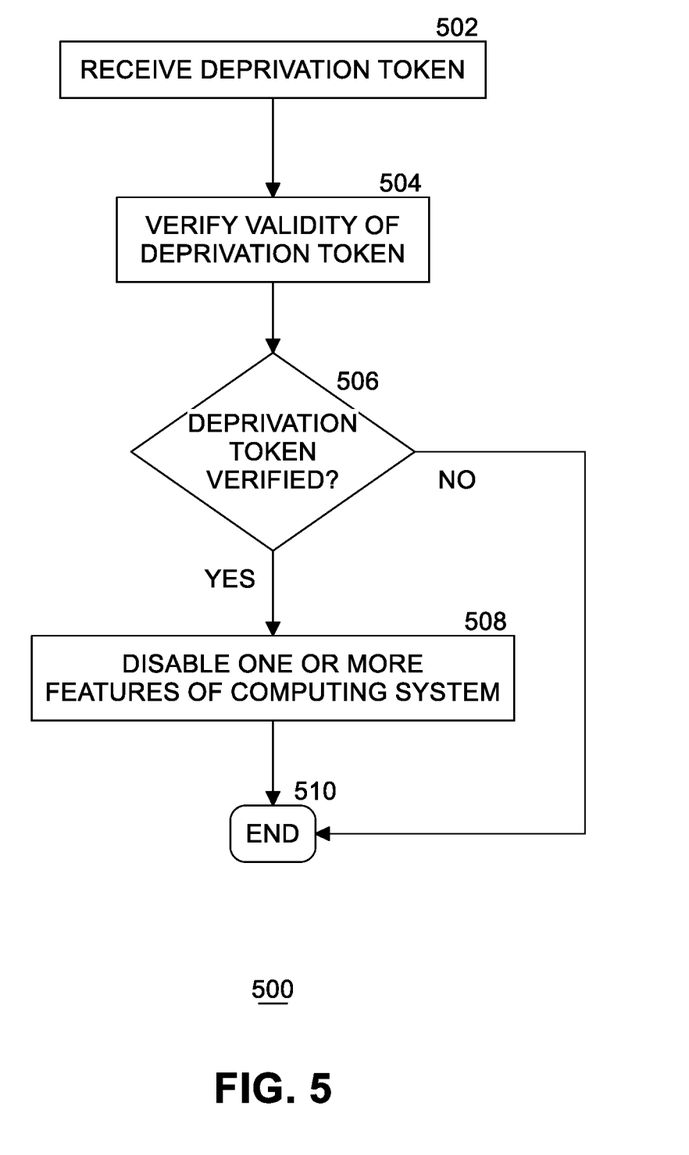
FIG. 5 is a flow diagram of feature controller processing according to some embodiments.

FIG. 5 is a flow diagram of feature controller 108 processing 500 according to some embodiments. At block 502, feature controller 108 of a computing system 100 (such as an enterprise computing system 212 or personal computing system 208) receives a deprivation token 204 using known communications methods. At block 504, feature controller 108 verifies the validity of the deprivation token. In an embodiment, verification includes authentication of digital signature 310 of deprivation token 204 using known cryptographic methods. If deprivation token 204 is verified at block 506, then at block 508 feature controller 108 disables one or more features of computing system 100 as specified by the deprivation token. The mechanism for disabling the feature is implementation specific depending on the selected feature. For example, receiving the deprivation token indicating a selected feature is to be disabled may result in firmware in computing system 100 making the selected feature (whether specific to firmware or hardware) inactive or otherwise unavailable. Processing ends at block 510. If at block 506 the deprivation token is not verified, then processing ends at block 510.

In another embodiment, processing similar to FIG. 5 is performed to re-enable one or more features. In this case, at block 508 feature controller 108 re-enables the specified one or more features. In another embodiment, feature controller 108 re-enables the specified one or more features only if a time period specified in valid time 304 of a previously received and processed deprivation token 204 has elapsed.

Figure 6:
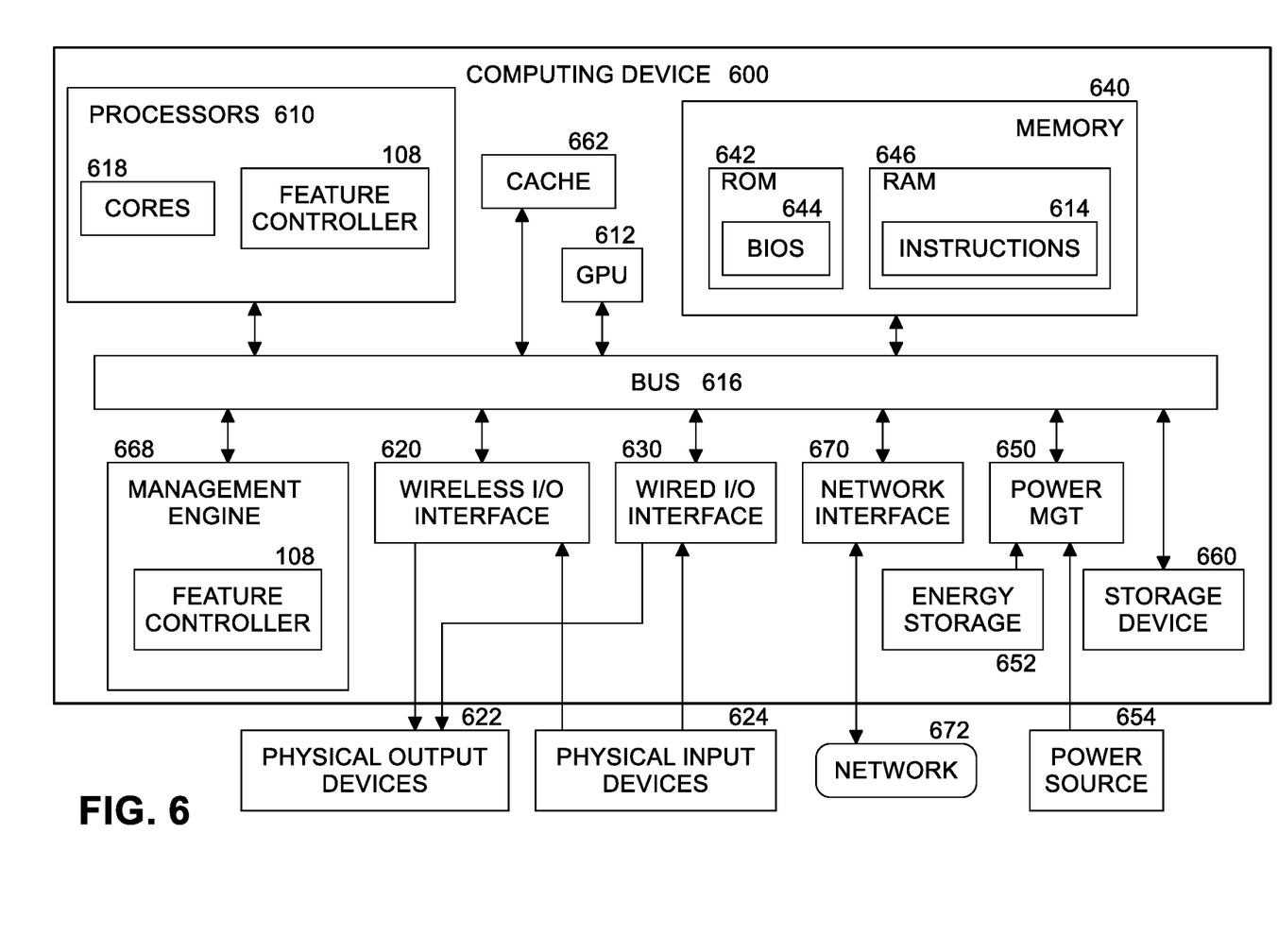
FIG. 6 is a schematic diagram of an illustrative electronic computing device to perform component manufacturer feature deprivation processing and/or feature controller processing according to some embodiments.

FIG. 6 is a schematic diagram of an illustrative electronic computing device to perform component manufacturer feature deprivation processing and/or feature controller processing according to some embodiments. Electronic computing device 600 is representative of computing system 100. In some embodiments, computing device 600 includes one or more processors 610 including one or more processors cores 618 and feature controller 108. In some embodiments, the computing device 600 includes management engine (ME) 668 having feature controller 108. In some embodiments, computing device 600 includes one or more features 104, 106, . . . 108 which may be enabled and/or disabled by feature controller 108. In an embodiment, processors 610 include one or more features 104, 106, . . . 108 which may be enabled and/or disabled by feature controller 108. In some embodiments, the computing device performs component manufacturer processing as described in FIG. 4. In some embodiments, the computing device is to implement feature controller processing, as provided in FIG. 5.

Computing device 600 may additionally include one or more of the following: cache 662, a graphical processing unit (GPU) 612 (which may be the hardware accelerator in some implementations), a wireless input/output (I/O) interface 620, a wired I/O interface 630, memory circuitry 640, power management circuitry 650, non-transitory storage device 660, and a network interface 670 for connection to a network 672. The following discussion provides a brief, general description of the components forming the illustrative computing device 600. Example, non-limiting computing devices 600 may include a desktop computing device, blade server device, workstation, laptop computer, mobile phone, tablet computer, personal digital assistant, or similar device or system.

In embodiments, the processor cores 618 are capable of executing machine-readable instruction sets 614, reading data and/or instruction sets 614 from one or more storage devices 660 and writing data to the one or more storage devices 660. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, FPAGs, IOT devices, and the like. For example, machine-readable instruction sets 614 may include instructions to implement component manufacturer feature deprivation processing, as provided in FIG. 4, or feature controller processing, as provided in FIG. 5.

The processor cores 618 may include any number of hardwired or configurable circuits, some or all of which may include programmable and/or configurable combinations of electronic components, semiconductor devices, and/or logic elements that are disposed partially or wholly in a PC, server, mobile phone, tablet computer, or other computing system capable of executing processor-readable instructions. Processor cores 618 may include one or more features 104, 106, . . . 108.

The computing device 600 includes a bus or similar communications link 616 that communicably couples and facilitates the exchange of information and/or data between various system components including the processor cores 618, the cache 662, the graphics processor circuitry 612, one or more wireless I/O interfaces 620, one or more wired I/O interfaces 630, one or more storage devices 660, and/or one or more network interfaces 670. The computing device 600 may be referred to in the singular herein, but this is not intended to limit the embodiments to a single computing device 600, since in certain embodiments, there may be more than one computing device 600 that incorporates, includes, or contains any number of communicably coupled, collocated, or remote networked circuits or devices.

The processor cores 618 may include any number, type, or combination of currently available or future developed devices capable of executing machine-readable instruction sets.

The processor cores 618 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks need not be described in further detail herein, as they will be understood by those skilled in the relevant art. The bus 616 that interconnects at least some of the components of the computing device 600 may employ any currently available or future developed serial or parallel bus structures or architectures.

The system memory 640 may include read-only memory ("ROM") 642 and random-access memory ("RAM") 646. A portion of the ROM 642 may be used to store or otherwise retain a basic input/output system ("BIOS") 644. The BIOS 644 provides basic functionality to the computing device 600, for example by causing the processor cores 618 to load and/or execute one or more machine-readable instruction sets 614. In embodiments, at least some of the one or more machine-readable instruction sets 614 cause at least a portion of the processor cores 618 to provide, create, produce, transition, and/or function as a dedicated, specific, and particular machine, for example a word processing machine, a digital image acquisition machine, a media playing machine, a gaming system, a communications device, a smartphone, a neural network, a machine learning model, or similar devices.

The computing device 600 may include at least one wireless input/output (I/O) interface 620. The at least one wireless I/O interface 620 may be communicably coupled to one or more physical output devices 622 (tactile devices, video displays, audio output devices, hardcopy output devices, etc.). The at least one wireless I/O interface 620 may communicably couple to one or more physical input devices 624 (pointing devices, touchscreens, keyboards, tactile devices, etc.). The at least one wireless I/O interface 620 may include any currently available or future developed wireless I/O interface. Example wireless I/O interfaces include, but are not limited to: BLUETOOTH®, near field communication (NFC), and similar.

The computing device 600 may include one or more wired input/output (I/O) interfaces 630. The at least one wired I/O interface 630 may be communicably coupled to one or more physical output devices 622 (tactile devices, video displays, audio output devices, hardcopy output devices, etc.). The at least one wired I/O interface 630 may be communicably coupled to one or more physical input devices 624 (pointing devices, touchscreens, keyboards, tactile devices, etc.). The wired I/O interface 630 may include any currently available or future developed I/O interface. Example wired I/O interfaces include but are not limited to: universal serial bus (USB), IEEE 1394 ("FireWire"), and similar.

The computing device 600 may include one or more communicably coupled, non-transitory, data storage devices 660. The data storage devices 660 may include one or more hard disk drives (HDDs) and/or one or more solid-state storage devices (SSDs). The one or more data storage devices 660 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 660 may include one or more removable storage devices, such as one or more flash drives, flash memories, flash storage units, or similar appliances or devices capable of communicable coupling to and decoupling from the computing device 600.

The one or more data storage devices 660 may include interfaces or controllers (not shown) communicatively coupling the respective storage device or system to the bus 616. The one or more data storage devices 660 may store, retain, or otherwise contain machine-readable instruction sets, data structures, program modules, data stores, databases, logical structures, and/or other data useful to the processor cores 618 and/or graphics processor circuitry 612 and/or one or more applications executed on or by the processor cores 618 and/or graphics processor circuitry 612. In some instances, one or more data storage devices 660 may be communicably coupled to the processor cores 618, for example via the bus 616 or via one or more wired communications interfaces 630 (e.g., Universal Serial Bus or USB); one or more wireless communications interfaces 620 (e.g., Bluetooth®, Near Field Communication or NFC); and/or one or more network interfaces 670 (IEEE 802.3 or Ethernet, IEEE 802.11, or Wi-Fi®, etc.).

Processor-readable instruction sets 614 and other programs, applications, logic sets, and/or modules may be stored in whole or in part in the system memory 640. Such instruction sets 614 may be transferred, in whole or in part, from the one or more data storage devices 660. The instruction sets 614 may be loaded, stored, or otherwise retained in system memory 640, in whole or in part, during execution by the processor cores 618 and/or graphics processor circuitry 612.

The computing device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the computing device 600. The power source 654 may include, but is not limited to, a solar power system, a commercial electric grid, a portable generator, an external energy storage device, or any combination thereof.

For convenience, the processor cores 618, the graphics processor circuitry 612, the wireless I/O interface 620, the wired I/O interface 630, the storage device 660, and the network interface 670 are illustrated as communicatively coupled to each other via the bus 616, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor cores 618 and/or the graphics processor circuitry 612. In some embodiments, all or a portion of the bus 616 may be omitted and the components are coupled directly to each other using suitable wired or wireless connections.

Flowcharts representative of example hardware logic, machine readable instructions, hardware implemented state machines, and/or any combination thereof for implementing computing device 600, for example, are shown in FIGS. 4 and 5. The machine-readable instructions may be one or more executable programs or portion(s) of an executable program for execution by a computer processor such as the processor 610 shown in the example computing device 600 discussed above in connection with FIG. 6, or management engine 668. The program may be embodied in software stored on a non-transitory computer readable storage medium such as a CD-ROM, a floppy disk, a hard drive, a DVD, a Blu-ray disk, or a memory associated with the processor 610, but the entire program and/or parts thereof could alternatively be executed by a device other than the processor 610 and/or embodied in firmware or dedicated hardware (such as management engine 668). Further, although the example program is described with reference to the flowcharts illustrated in FIGS. 4 and 5, many other methods of implementing the example computing devices 600 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine-readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein.

In another example, the machine-readable instructions may be stored in a state in which they may be read by a computer system, but require addition of a library (e.g., a dynamic link library (DLL)), a software development kit (SDK), an application programming interface (API), etc., in order to execute the instructions on a particular computing device or other device. In another example, the machine-readable instructions may be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine readable instructions and/or program(s) regardless of the particular format or state of the machine readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4 and 5 may be implemented using executable instructions (e.g., computer and/or machine-readable instructions) stored on a non-transitory computer and/or machine-readable medium such as a hard disk drive, an SSD, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended.

The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The following examples pertain to further embodiments. Example 1 is an apparatus to perform threat prevention by selective feature deprivation. The apparatus includes a processing device; and a memory device coupled to the processing device, the memory device having instructions stored thereon that, in response to execution by the processing device, cause the processing device to: generate a deprivation token to cause disabling of a selected one or more features of a component of a computing system to prevent an exploit of a vulnerability affecting the selected one or more features; and publish the derivation token to at least one of a computing system manufacturer computing system and an enterprise information technology (IT) computing system.

In Example 2, the subject matter of Example 1 can optionally include instructions stored in the memory device that, in response to execution by the processing device, cause the processing device to distribute the derivation token to the computing system.

In Example 3, the subject matter of Example 1 can optionally include wherein the computing system comprises at least one of an affected enterprise computing system and a personal computing system.

In Example 4, the subject matter of Example 1 can optionally include instructions stored in the memory device that, in response to execution by the processing device, cause the processing device to determine the selected one or more features that can be disabled, without causing the computing system to malfunction, at a time of design or manufacturing of the component.

In Example 5, the subject matter of Example 1 can optionally include instructions stored in the memory device that, in response to execution by the processing device, cause the processing device to determine if the vulnerability exists for the selected one or more features.

In Example 6, the subject matter of Example 1 can optionally include wherein the deprivation token comprises a vulnerability identifier (ID), a valid time, one or more feature IDs, and a digital signature.

In Example 7, the subject matter of Example 6 can optionally include instructions stored in the memory device that, in response to execution by the processing device, cause the processing device to digitally sign the deprivation token prior to publishing the derivation token.

In Example 8, the subject matter of Example 6 can optionally include wherein the deprivation token comprises an enablement field to cause re-enabling of a previously disabled selected one or more features on the computing system.

In Example 9, the subject matter of Example 6 can optionally include wherein the valid time to cause disabling of the selected one or more features for a specified time period.

In Example 10, the subject matter of Example 1 can optionally include wherein the component comprises a processor and the feature is a hardware capability of the processor.

In Example 11, the subject matter of Example 1 can optionally include including the deprivation token in a firmware update to the computing system.

Example 12 is a method for performing threat prevention by selective feature deprivation. The method includes generating a deprivation token to cause disabling of a selected one or more features of a component of a computing system to prevent an exploit of a vulnerability affecting the selected one or more features; and publishing the derivation token to at least one of a computing system manufacturer computing system and an enterprise information technology (IT) computing system.

In Example 13, the subject matter of claim 12 can optionally include distributing the derivation token to the computing system.

In Example 14, the subject matter of claim 12 can optionally include determining the selected one or more features that can be disabled, without causing the computing system to malfunction, at a time of design or manufacturing of the component.

In Example 15, the subject matter of claim 12 can optionally include determining if the vulnerability exists for the selected one or more features.

In Example 16, the subject matter of claim 12 can optionally include wherein the deprivation token comprises a vulnerability identifier (ID), a valid time, one or more feature IDs, and a digital signature.

In Example 17, the subject matter of claim 16 can optionally include digitally signing the deprivation token prior to publishing the derivation token.

In Example 18, the subject matter of claim 12 can optionally include wherein the deprivation token comprises an enablement field to cause re-enabling of a previously disabled selected one or more features on the computing system.

In Example 19, the subject matter of claim 12 can optionally include including the deprivation token in a firmware update to the computing system.

Example 20 is at least one non-transitory machine-readable storage mediums having instructions that, when executed, cause at least one processor to generate a deprivation token to cause disabling of a selected one or more features of a component of a computing system to prevent an exploit of a vulnerability affecting the selected one or more features; and publish the derivation token to at least one of a computing system manufacturer computing system and an enterprise information technology (IT) computing system.

In Example 21, the subject matter of claim 20 can optionally include instructions that, when executed, cause at least one processor to distribute the derivation token to the computing system.

In Example 22, the subject matter of claim 20 can optionally include instructions that, when executed, cause at least one processor to determine the selected one or more features that can be disabled, without causing the computing system to malfunction, at a time of design or manufacturing of the component.

In Example 23, the subject matter of claim 20 can optionally include wherein the deprivation token comprises a vulnerability identifier (ID), a valid time, one or more feature IDs, and a digital signature.

In Example 24, the subject matter of claim 20 can optionally include instructions that, when executed, cause at least one processor to digitally signing the deprivation token prior to publishing the derivation token.

In Example 25, the subject matter of claim 20 can optionally include wherein the deprivation token comprises an enablement field to cause re-enabling of a previously disabled selected one or more features on the computing system.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:
   a processing device; and
   a memory device coupled to the processing device, the memory device having instructions stored thereon that, in response to execution by the processing device, cause the processing device to:
   generate a deprivation token to cause disabling of a selected one or more features of a component of a computing system to prevent an exploit of a vulnerability affecting the selected one or more features;
   digitally sign the deprivation token; and
   send the digitally signed deprivation token to at least one of a computing manufacturer's computing system and an enterprise computing system, over a communications network.

2. The apparatus of claim 1, comprising instructions stored in the memory device that, in response to execution by the processing device, cause the processing device to:
   distribute the deprivation token to the computing system.

3. The apparatus of claim 1, wherein the computing system comprises at least one of an affected enterprise computing system and a personal computing system.

4. The apparatus of claim 1, comprising instructions stored in the memory device that, in response to execution by the processing device, cause the processing device to determine the selected one or more features that can be disabled, without causing the computing system to malfunction, at a time of design or manufacturing of the component.

5. The apparatus of claim 1, comprising instructions stored in the memory device that, in response to execution by the processing device, cause the processing device to determine if the vulnerability exists for the selected one or more features.

6. The apparatus of claim 1, wherein the deprivation token comprises a vulnerability identifier (ID), a valid time, one or more feature IDs, and a digital signature.

7. The apparatus of claim 6, comprising instructions stored in the memory device that, in response to execution by the processing device, cause the processing device to digitally sign the deprivation token prior to publishing the deprivation token.

8. The apparatus of claim 6, wherein the deprivation token comprises an enablement field to cause re-enabling of a previously disabled selected one or more features on the computing system.

9. The apparatus of claim 6, wherein the valid time to cause disabling of the selected one or more features for a specified time period.

10. The apparatus of claim 1, wherein the component comprises a processor and the feature is a hardware capability of the processor.

11. The apparatus of claim 1, comprising including the deprivation token in a firmware update to the computing system.

12. A computer-implemented method comprising:
generating a deprivation token to cause disabling of a selected one or more features of a component of a computing system to prevent an exploit of a vulnerability affecting the selected one or more features;
digitally signing the deprivation token; and
sending the digitally signed derivation token to at least one of a computing manufacturer's computing system and an enterprise computing system, over a communications network.

13. The computer-implemented method of claim 12, comprising distributing the deprivation token to the computing system.

14. The computer-implemented method of claim 12, comprising determining the selected one or more features that can be disabled, without causing the computing system to malfunction, at a time of design or manufacturing of the component.

15. The computer-implemented method of claim 12, comprising determining if the vulnerability exists for the selected one or more features.

16. The computer-implemented method of claim 12, wherein the deprivation token comprises a vulnerability identifier (ID), a valid time, one or more feature IDs, and a digital signature.

17. The computer-implemented method of claim 16, comprising digitally signing the deprivation token prior to publishing the deprivation token.

18. The computer-implemented method of claim 16, wherein the deprivation token comprises an enablement field to cause re-enabling of a previously disabled selected one or more features on the computing system.

19. The computer-implemented method of claim 16, comprising including the deprivation token in a firmware update to the computing system.

20. At least one non-transitory machine-readable storage medium comprising instructions that, when executed, cause at least one processor to:
generate a deprivation token to cause disabling of a selected one or more features of a component of a computing system to prevent an exploit of a vulnerability affecting the selected one or more features;
digitally sign the deprivation token; and
send the digitally signed derivation token to at least one of a computing system manufacturer's computing system and an enterprise computing system, over a communications network.

21. The at least one non-transitory machine-readable storage medium of claim 20 comprising instructions that, when executed, cause at least one processor to distribute the deprivation token to the computing system.

22. The at least one non-transitory machine-readable storage medium of claim 20 comprising instructions that, when executed, cause at least one processor to determine the selected one or more features that can be disabled, without causing the computing system to malfunction, at a time of design or manufacturing of the component.

23. The at least one non-transitory machine-readable storage medium of claim 20, wherein the deprivation token comprises a vulnerability identifier (ID), a valid time, one or more feature IDs, and a digital signature.

24. The at least one non-transitory machine-readable storage medium of claim 23, wherein the deprivation token comprises an enablement field to cause re-enabling of a previously disabled selected one or more features on the computing system.

\* \* \* \* \*